(12) United States Patent
Liu et al.

(10) Patent No.: US 10,754,093 B2
(45) Date of Patent: Aug. 25, 2020

(54) FABRICATION PROCESS OF POLYMER BASED PHOTONIC APPARATUS AND THE APPARATUS

(71) Applicant: Lightwave Logic Inc., Longmont, CO (US)

(72) Inventors: Zhiming Liu, Englewood, CO (US); Michael Lebby, San Francisco, CA (US); Brian Shaw, Fort Collins, CO (US); Richard Becker, Cupertino, CA (US); Youngwoo Yi, Louisville, CO (US)

(73) Assignee: Lightwave Logic Inc., Englewood, CO (US)

( * ) Notice: Subject to any disclaimer, the term of this patent is extended or adjusted under 35 U.S.C. 154(b) by 0 days.

(21) Appl. No.: 16/411,583

(22) Filed: May 14, 2019

(65) Prior Publication Data

US 2019/0353843 A1 Nov. 21, 2019

Related U.S. Application Data

(60) Provisional application No. 62/672,045, filed on May 15, 2018.

(51) Int. Cl.
*G02B 6/122* (2006.01)
*G02F 1/065* (2006.01)
*G02B 6/136* (2006.01)

(52) U.S. Cl.
CPC .......... *G02B 6/1221* (2013.01); *G02B 6/136* (2013.01); *G02F 1/065* (2013.01)

(58) Field of Classification Search
None
See application file for complete search history.

(56) References Cited

U.S. PATENT DOCUMENTS

| 5,887,116 | A | * | 3/1999 | Grote | G02F 1/065 |
|---|---|---|---|---|---|
| | | | | | 385/122 |
| 6,549,685 | B2 | * | 4/2003 | Marks | B82Y 10/00 |
| | | | | | 385/130 |
| 10,520,673 | B2 | * | 12/2019 | Becker | G02B 6/1221 |
| 10,527,786 | B2 | * | 1/2020 | Leonberger | G02B 6/29352 |

(Continued)

*Primary Examiner* — Tina M Wong
(74) *Attorney, Agent, or Firm* — Parsons & Goltry; Robert Parsons; Michael Goltry

(57) ABSTRACT

A method of fabricating polymer modulators includes forming an insulating layer on a platform and depositing and patterning a ground electrode on the insulating layer. A bottom polymer cladding layer, a first blocking layer, a polymer core layer, a second blocking layer, and a top polymer cladding layer are deposited in order. A third blocking layer is deposited on the top cladding layer and patterned to define vias which are used to etch ground openings through the top polymer cladding layer, the second blocking layer, the core layer, the first blocking layer, and the bottom cladding layer to the ground electrode. The openings are filled with electrically conductive material from electrical communication with the ground electrode to a surface of the top polymer cladding layer. The third blocking layer is removed and electrical contacts are formed on the top polymer cladding layer in electrical communication with the electrically conductive material.

33 Claims, 6 Drawing Sheets

(56) References Cited

U.S. PATENT DOCUMENTS

| | | | |
|---|---|---|---|
| 2005/0002631 A1* | 1/2005 | Yamaguchi | G02B 6/1221 385/130 |
| 2008/0081204 A1* | 4/2008 | Ho | A61F 5/0104 428/492 |
| 2011/0058766 A1* | 3/2011 | Marks | B82Y 20/00 385/2 |
| 2012/0163749 A1* | 6/2012 | Huang | G02B 6/12004 385/3 |
| 2015/0131939 A1* | 5/2015 | Tseng | G02B 6/12004 385/14 |
| 2016/0131837 A1* | 5/2016 | Mahgerefteh | G02B 6/1223 385/14 |
| 2016/0230961 A1* | 8/2016 | Seo | G02B 1/14 |
| 2017/0242189 A1* | 8/2017 | Yokoyama | C08L 101/02 |
| 2017/0351027 A1* | 12/2017 | Reano | G02B 6/12 |
| 2018/0081204 A1* | 3/2018 | Ma | G02F 1/0508 |
| 2018/0275485 A1* | 9/2018 | Hurwitz | H03H 9/02228 |
| 2019/0094461 A1* | 3/2019 | Kleinert | G02F 1/011 |
| 2019/0204506 A1* | 7/2019 | Becker | G02B 6/12004 |
| 2019/0302355 A1* | 10/2019 | Takano | G02F 1/065 |
| 2019/0353843 A1* | 11/2019 | Liu | G02F 1/065 |

\* cited by examiner

FABRICATION PROCESS OF POLYMER BASED PHOTONIC APPARATUS AND THE APPARATUS

CROSS-REFERENCE TO RELATED APPLICATION

This application claims the benefit of U.S. Provisional Patent Application No. 62/672,045, filed 15 May 2018.

FIELD OF THE INVENTION

This invention relates to a method/process of fabricating polymer based photonic apparatus and the like and the apparatus.

BACKGROUND OF THE INVENTION

Multi-level polymer based photonic devices, such as modulators and the like can be very difficult to deposit or otherwise build-up. Generally, the various polymer layers in a multi-layer structure are deposited in a solution, for example by spin coating or similar processes. In such processes solvents in the solution can attack previously deposited layers or in some instances even the next layer to be deposited. This attack can occur during coating and during the baking process when the polymer is hardened. The solvent attacks can cause cracking and delamination, either greatly diminishing the operation of the photonic device or, in some instances, making the photonic device completely useless.

Accordingly, it is an object of the present invention to provide a new and improved process of fabricating multi-layer polymer photonic devices and, specifically modulators.

It is another object of the present invention to provide a new and improved process of fabricating multi-layer polymer photonic devices that prevents solvent attacking of previous and following layers of material.

It is another object of the present invention to provide new and improved multi-layer polymer photonic devices.

SUMMARY OF THE INVENTION

Briefly to achieve the desired objects and advantages of the instant invention in accordance with a preferred method of fabricating polymer based photonic apparatus including the steps of providing a platform, forming a layer of dielectric or insulating material on the platform, and depositing and patterning a ground electrode on the layer of dielectric or insulating material. A bottom cladding layer of polymer material is deposited on the ground electrode and on exposed portions of the layer of dielectric or insulating material. A first blocking layer is deposited on the bottom cladding layer and a core layer of polymer material is deposited on the first blocking layer. A second blocking layer is deposited on the core layer and a top cladding layer of polymer material is deposited on the second blocking layer. A third blocking layer is deposited on top of the cladding layer and patterned to define vias. The vias are used to etch ground openings through the top polymer cladding layer, the second blocking layer, the core layer, the first blocking layer, and the bottom cladding layer to the ground electrode. An electrically conductive material is deposited in the ground openings, the electrically conductive material extending from electrical communication with the ground electrode to a surface of the top polymer cladding layer. Electrical contacts are deposited on top of polymer cladding layer, at least some of the electrical contacts being in electrical communication with the electrically conductive material.

To further achieve the desired objects and advantages of the present invention a specific method of fabricating polymer based photonic apparatus includes the steps of providing a semiconductor wafer, forming a layer of dielectric or insulating material on the semiconductor wafer, and depositing and patterning a ground electrode on the layer of dielectric or insulating material. A bottom cladding layer of polymer material is deposited on the ground electrode and on exposed portions of the layer of dielectric or insulating material including spin coating a layer of formulated solution containing a selected polymer and baking the layer. A first blocking layer is deposited on the bottom cladding layer and a core layer of polymer material is deposited on the first blocking layer including spin coating a layer of formulated solution containing a selected polymer and baking the layer. A second blocking layer is deposited on the core layer and a top cladding layer of polymer material is deposited on the second blocking layer including spin coating a layer of formulated solution containing a selected polymer and baking the layer. A third blocking layer is deposited on the top cladding layer and patterned to define vias. Using the vias, ground openings are etched through the top polymer cladding layer, the second blocking layer, the core layer, the first blocking layer, and the bottom cladding layer to the ground electrode and an electrically conductive material is deposited in the ground openings, the electrically conductive material extending from electrical communication with the ground electrode to a surface of the top polymer cladding layer. The third blocking layer is removed and electrical contacts are deposited on the top polymer cladding layer, at least some of the electrical contacts being in electrical communication with the electrically conductive material.

To further achieve the desired objects and advantages of the present invention a specific embodiment of polymer based photonic apparatus is provided. The polymer based photonic apparatus includes a semiconductor wafer with a layer of dielectric or insulating material on the semiconductor wafer and a ground electrode on the layer of dielectric or insulating material. A bottom cladding layer of polymer material is positioned on the ground electrode and on exposed portions of the layer of dielectric or insulating material, a first blocking layer is positioned on the bottom cladding layer, a core layer of polymer material is positioned on the first blocking layer, a second blocking layer is positioned on the core layer, and a top cladding layer of polymer material is positioned on the second blocking layer. Ground openings extend through the top cladding layer, the second blocking layer, the core layer, the first blocking layer, and the bottom cladding layer to the ground electrode and electrically conductive material fills the ground openings, the electrically conductive material extending from electrical communication with the ground electrode to a surface of the top polymer cladding layer. Electrical contacts are positioned on the top polymer cladding layer, at least some of the electrical contacts being in electrical communication with the electrically conductive material.

BRIEF DESCRIPTION OF THE DRAWINGS

Specific objects and advantages of the invention will become readily apparent to those skilled in the art from the following detailed description of a preferred embodiment thereof, taken in conjunction with the drawings in which.

DETAILED DESCRIPTION OF THE DRAWINGS

Figure 1:
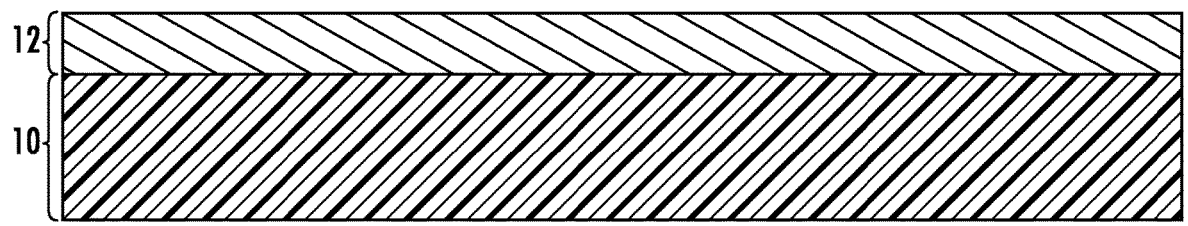
FIGS. 1 through 18 each illustrate one or more steps in a process of fabricating a multi-layer polymer photonic device, in this specific example a polymer modulator, according to the present invention.

Turning now to the drawings in which like reference characters indicate corresponding elements throughout the several views, attention is directed to FIG. 1 which illustrates a silicon wafer 10. In the novel process being disclosed, the first step is the provision of a platform, which in this example is silicon wafer 10. In this preferred embodiment, silicon wafer 10 is an intrinsic undoped fused silicon wafer with a resistivity higher than 10 kilo-Ohms. Silicon wafer 10 is thermally oxidized to provide a layer 12 of silicon oxide ($SiO_2$) approximately 1000 nanometers (nm) thick on the upper surface. The thermal oxide can be provided on both sides of wafer 10 but only the upper surface is preferred. It will be understood that other methods of producing the silicon oxide can be used and in some applications other dielectric or insulating material might be used but thermally oxidizing the silicon wafer is the simplest process. Also, other platforms, such as SiGe (for longer wavelength photodetector integration), SOI (silicon-on-insulator), sapphire, SiC, and InP/III-V compound semiconductor platforms including InP, GaAs, GaN, GaSb, might be used in place of the silicon described above.

Figure 2:
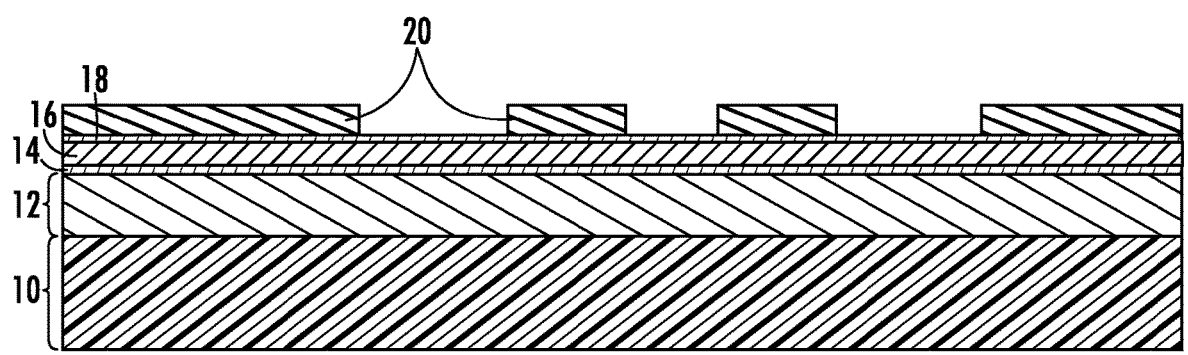

Turning now to FIG. 2, several steps in a process for patterning a ground electrode are illustrated. In the next step(s), a 7.5 nm thick layer 14 of titanium is sputtered onto the upper surface of silicon oxide layer 12, a 500 nm thick layer 16 of gold is sputtered onto titanium layer 14, and a 7.5 nm thick layer 18 of titanium is sputtered onto gold layer 18. In the next step(s), a layer 20 of photoresist is spin coated onto the upper surface of titanium layer 18, exposed to UV light through a mask and developed to leave the patterned layer illustrated.

Figure 3:
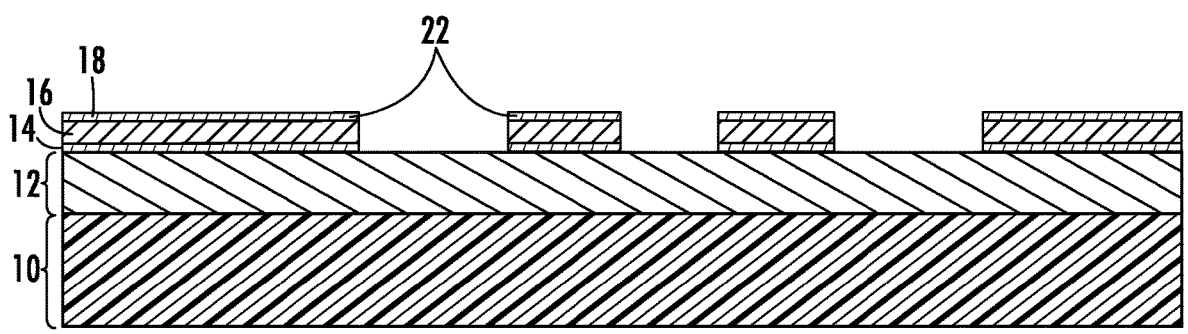

Turning now to FIG. 3, the next step(s) in the present process are illustrated. Using patterned photoresist layer 20, titanium layer 18 is etched, gold layer 16 is etched, and titanium layer 14 is etched using a wet etching process. Photoresist layer 20 is then stripped, leaving the ground electrode contacts 22.

Figure 4:
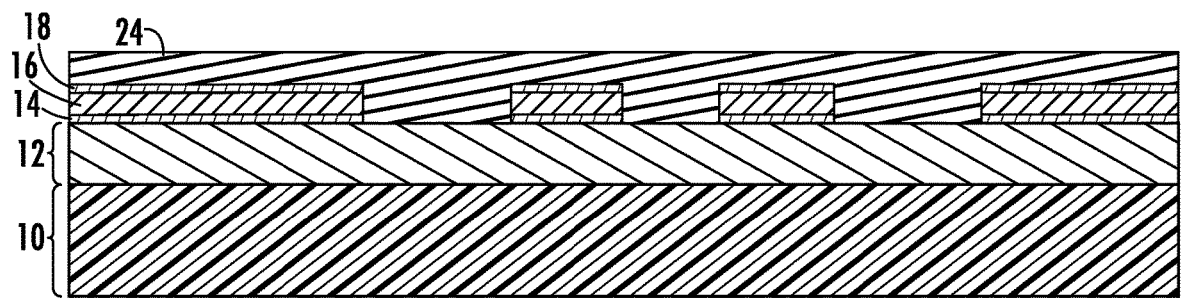
Figure 5:
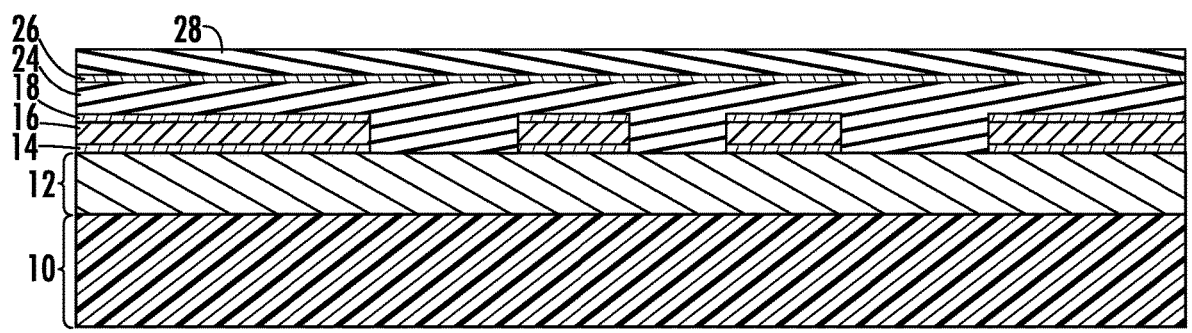

Turning to FIG. 4, a bottom cladding layer 24 of polymer material is deposited, in this preferred embodiment, by spin coating a formulated solution containing the desired polymer. After standard soft baking and hard baking steps, bottom cladding layer 24 is 3.5 µm (micrometers)+/−0.5 µm thick (thicker is better). Referring additionally to FIG. 5, a 50 nm+/−10 nm to 20 nm thick blocking layer 26 of aluminum oxide is deposited by sputtering. The next step includes spin coating a formulated solution containing the desired polymer to form a core layer 28 for a polymer waveguide. After standard soft baking and hard baking steps, core layer 28 is 1.6 µm (micrometers)+/−0.2 µm thick. Here it should be noted that blocking layer 26 protects bottom cladding layer 24 from solvents in the solution producing core layer 28. Also, blocking layer 26 protects core layer 28 from any residual solvents that might remain in bottom cladding layer 24.

Figure 6:
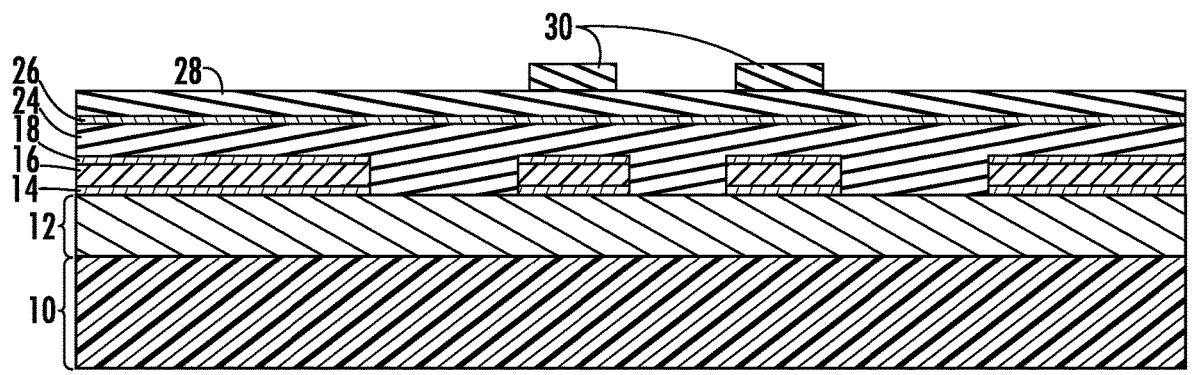
Figure 7:
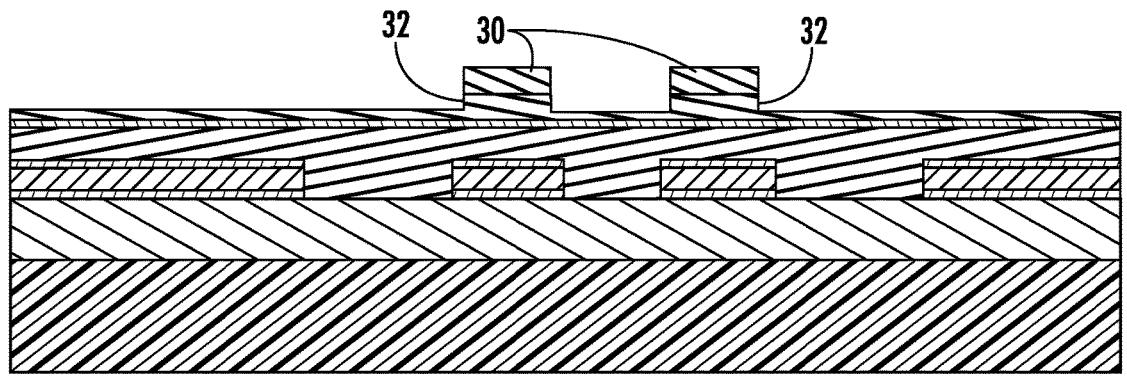

Turning now to FIG. 6, a photoresist layer is spin coated onto the upper surface of core layer 28, exposed to UV light through a mask, and developed to produce a ridge waveguide pattern 30. Referring additionally to FIG. 7, using ridge waveguide pattern 30, core layer 28 is RIE etched to make a waveguide ridge 32, which is 0.8 µm+/−0.1 µm high.

Figure 8:
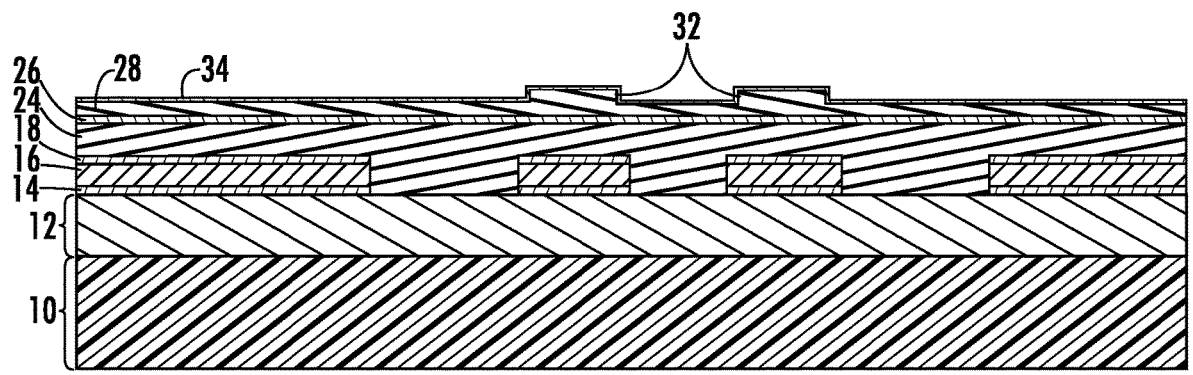

As illustrated in FIG. 8, photoresist 30 is stripped to leave only the upper surface and ridge of core layer 28. A blocking layer 34 of aluminum oxide is sputter deposited on the upper surface of core layer 28 and ridge 32. Blocking layer 34 is 50 nm+/−10 nm thick.

Figure 9:
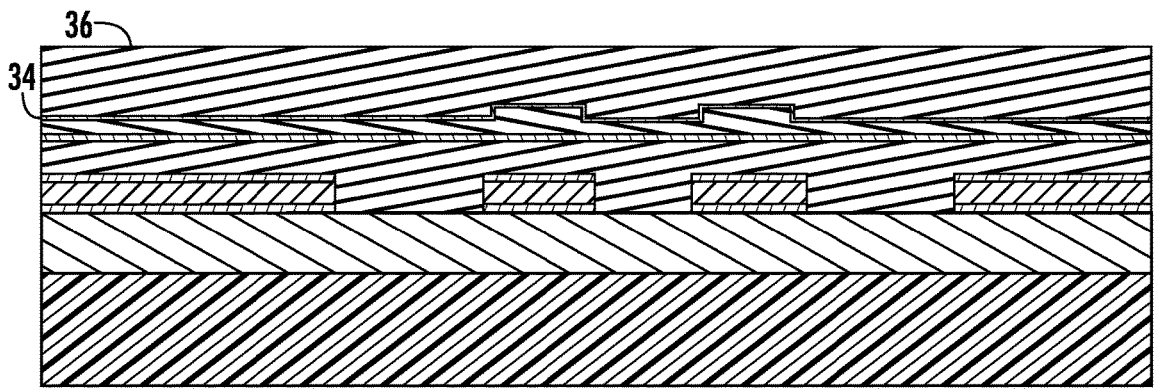

Turning now to FIG. 9, a top polymer cladding layer 36 is deposited on the upper surface of blocking layer 34. Top cladding layer 36 of polymer material is deposited, in this preferred embodiment, by spin coating a formulated solution containing the desired polymer. After standard soft baking and hard baking steps, top cladding layer 36 is 3.5 µm (micrometers)+/−0.5 µm thick (thicker is better). Here it should be noted that blocking layer 34 protects core layer 28 from solvents in the solution producing top cladding layer 36 and the baking process. Also, blocking layer 34 protects top cladding layer 36 from any residual solvents that might remain in core layer 28.

Figure 10:
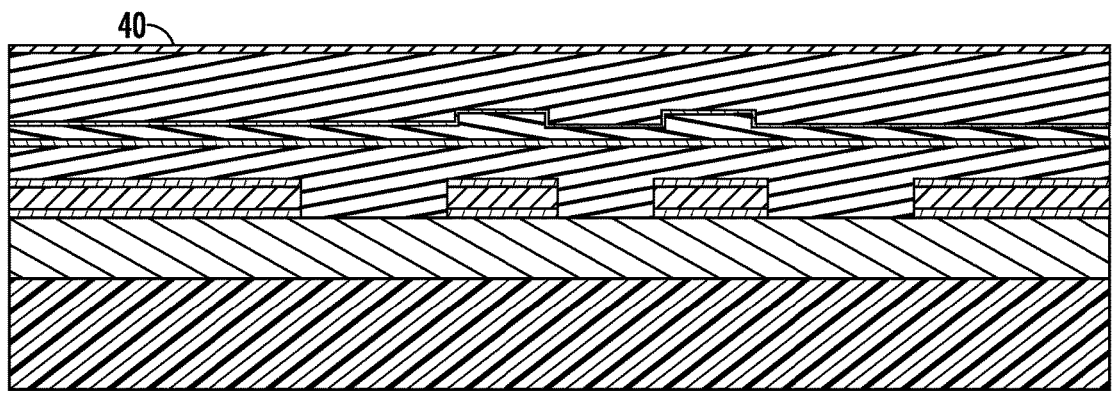
Figure 11:
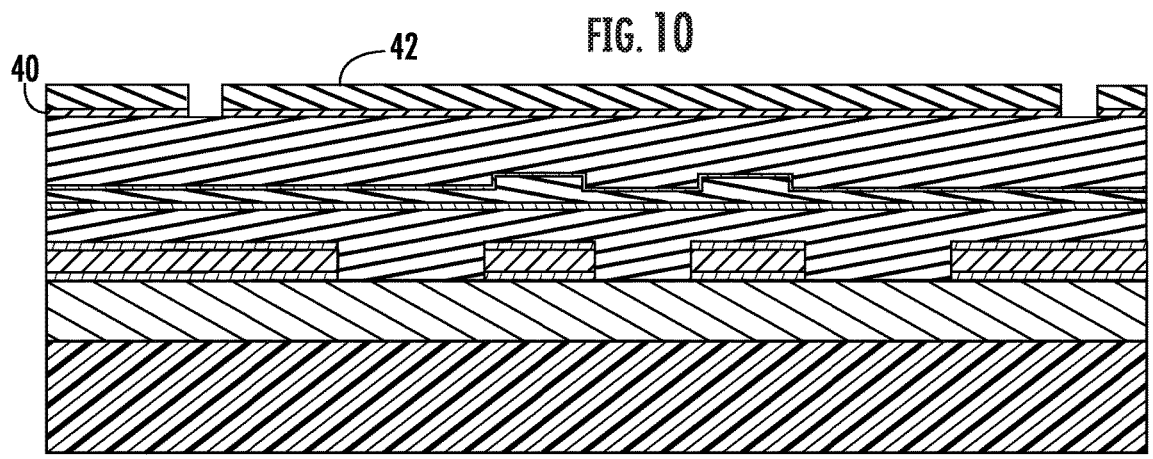
Figure 12:
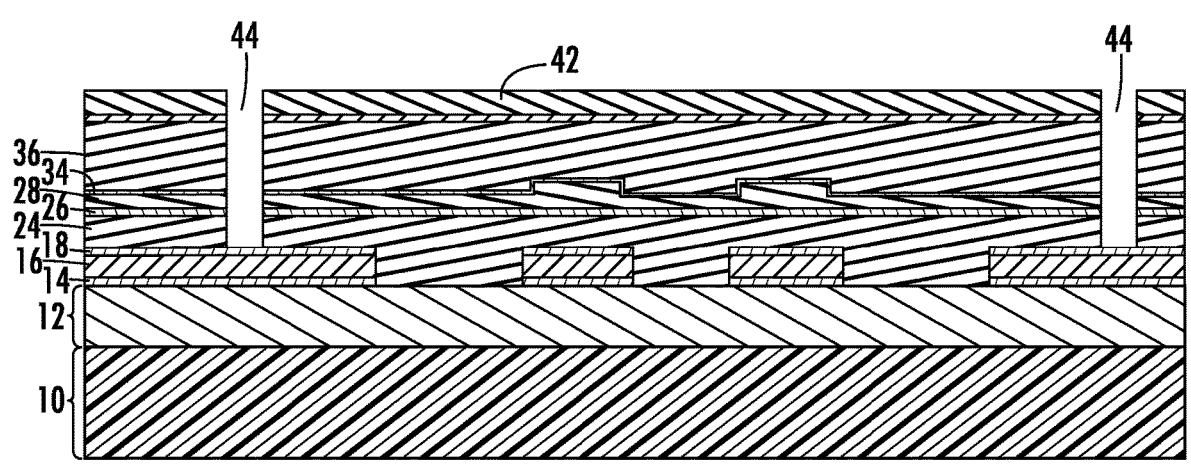
Figure 13:
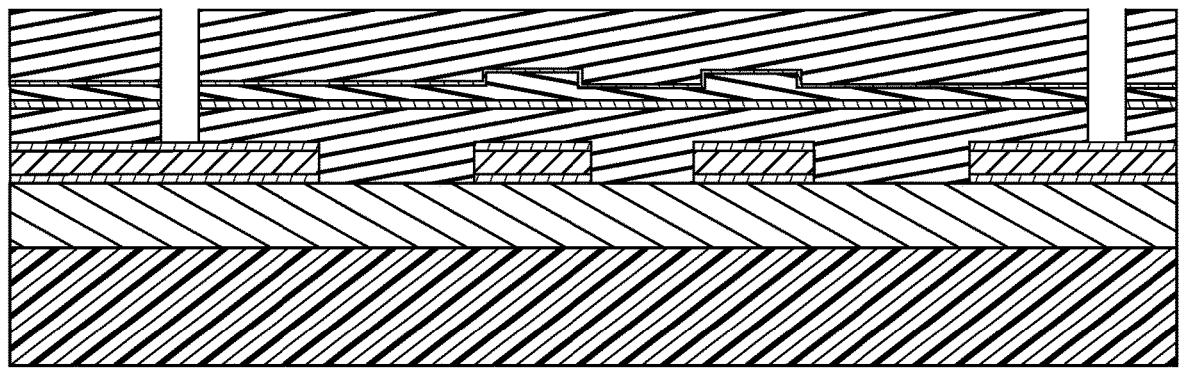

Turning now to FIG. 10, a gold blocking layer 40 is sputter deposited on the upper surface of top cladding layer 36. Referring additionally to FIG. 11, a layer of photoresist is spin coated on the upper surface of gold blocking layer 40, exposed to UV light through a mask, and developed to leave patterned layer 42, which is then used to etch vias or ground openings 44 through gold blocking layer 40, top cladding layer 36, blocking layer 34, Core layer 28, blocking layer 26, and bottom cladding layer 24 to the upper surface of titanium layer 18, as illustrated in FIG. 12. Preferably, the etching is accomplished by wet etching gold blocking layer 40, RIE etching top cladding layer 36, wet etching blocking layer 34, RIE etching core layer 28, wet etching blocking layer 26, and RIE etching bottom cladding layer 24 to the upper surface of titanium layer 18. Titanium layer 18 may also be wet etched to improve the electrical contact by directly contacting gold layer 16. Throughout the masking and etching process, gold blocking layer 40 protects top cladding layer 36. As illustrated in FIG. 13, photoresist patterned layer 42 is stripped and gold blocking layer 40 is removed by wet etching to leave the upper surface of top cladding layer 36 exposed.

Figure 14:
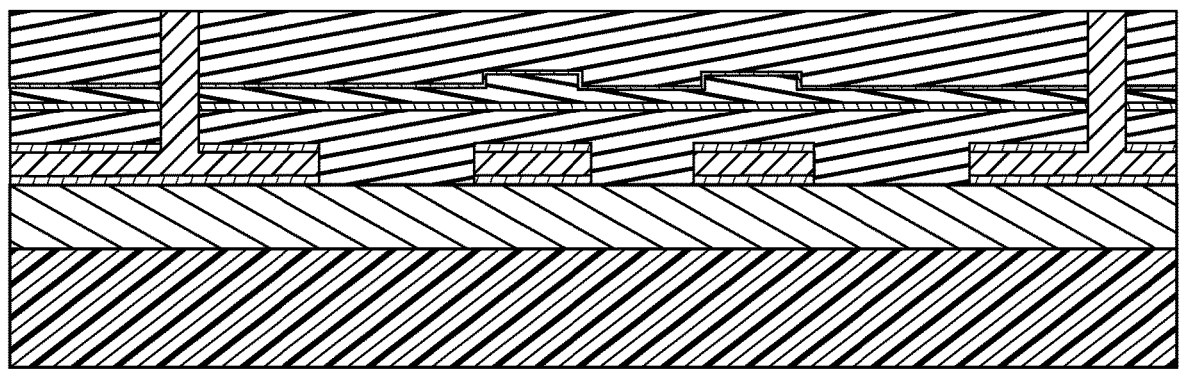
Figure 15:
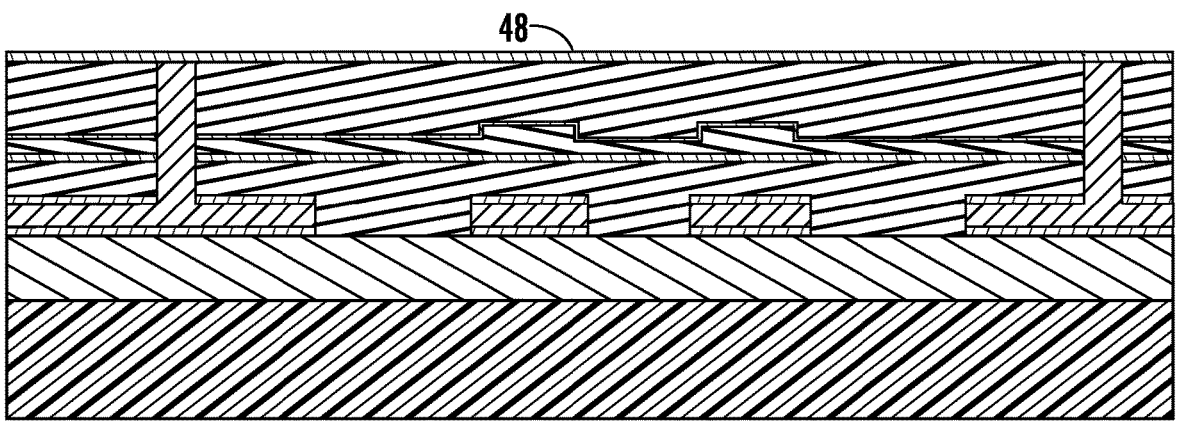
Figure 16:
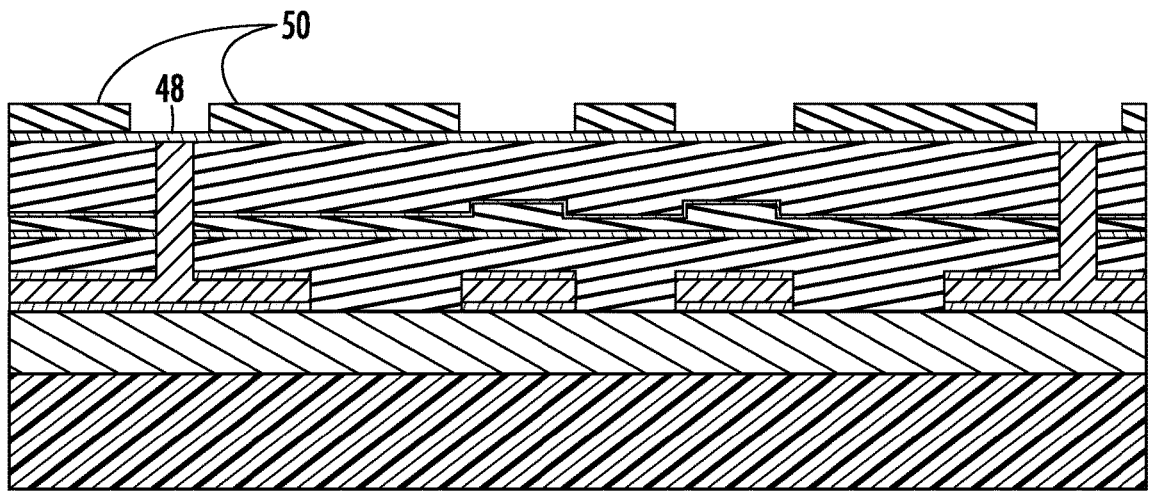
Figure 17:
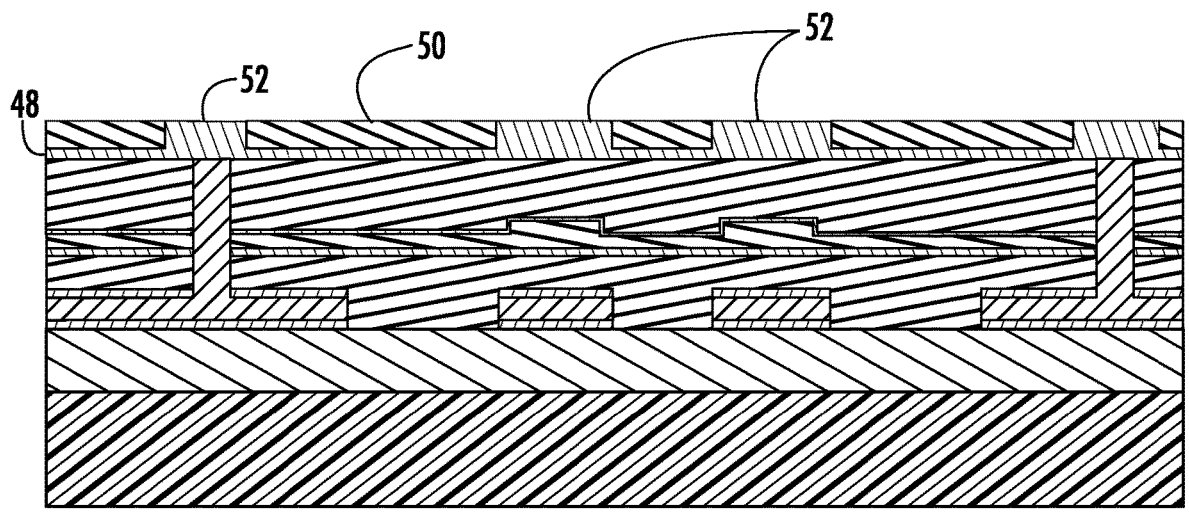
Figure 18:
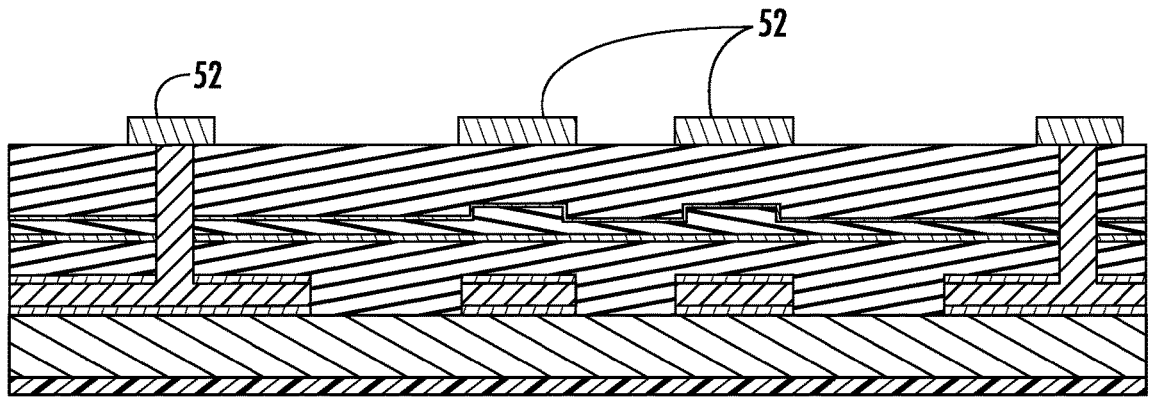

The next step is to fill vias or ground openings 44 by electroplating gold, as illustrated in FIG. 14. A 200 nm thick gold seed layer 48 is sputtered onto the surface of top cladding layer 36 as illustrated in FIG. 15. A layer of photoresist is spin coated on the upper surface of gold seed layer 48, exposed to UV light through a mask, and developed to leave patterned layer 50. Gold contacts 52 are electroplated onto portions of gold seed layer 48 exposed in openings defined by patterned layer 50, as illustrated in FIG. 17. Photoresist patterned layer 50 is then stripped and gold seed layer 48 is removed by wet etching to leave electrical contacts 52. Referring specifically to FIG. 18, it can be seen that the two outside contacts 52 are electrically connected through gold filled vias or ground openings 44 to the ground electrode, including titanium layer 14, gold layer 16, and titanium layer 18. Also each of the two middle contacts 52 overlie one of waveguide ridges 32 to operate as an upper electrical contact.

It should be understood that while a silicon wafer is used and described in the above example, other semiconductor wafers could be used in specific applications. For example, in the above described process an InP wafer (i.e. a III-V substrate) could be substituted for silicon wafer 10. Also, when incorporating the above described photonic devices into a photonic platform such as that described in copending patent application entitled "Polymer Modulator and Laser Integrated on a Common Platform and Method", filed Aug. 31, 2017, with application Ser. No. 15/692,080, and incorporated herein by reference, a SiGe substrate could be used (or SiGe layers could be deposited/grown) for at least a photodetector to provide for longer wavelength detection. Further, CMOS type integration is contemplated and fabrication on silicon-on-insulator, sapphire, SiC type platforms. Generally, the above fabrication process is useful in fabricating polymer modulators and especially modulators of the Mach-Zehnder format, intensity modulators, phase modulators, and the like. It will also be understood that while a single photonic device (e.g. polymer modulator) is described, a plurality of devices is well within the fabrication process.

Thus, a fabrication process is disclosed that provides a novel approach to build-up three or more layer polymer stacks, especially for polymer based modulators, such as modulators of the Mach-Zehnder format, intensity modulators, phase modulators, and the like. The novel fabrication process includes various blocking layers, especially at the interfaces of cladding and core layers, effective to prevent solvent attacking of previous polymer layers during coating and baking and, thus, avoiding cracking and delamination. While the disclosure focuses primarily on the fabrication process, it should be understood that in many instances the apparatus is also novel.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A method of fabricating polymer based photonic apparatus comprising the steps of:
   providing a platform;
   forming a layer of dielectric or insulating material on the platform;
   depositing and patterning a ground electrode on the layer of dielectric or insulating material;
   depositing a bottom cladding layer of polymer material on the ground electrode and on exposed portions of the layer of dielectric or insulating material;
   depositing a first blocking layer on the bottom cladding layer;
   depositing a core layer of polymer material on the first blocking layer;
   depositing a second blocking layer on the core layer;
   depositing a top cladding layer of polymer material on the second blocking layer;
   depositing a third blocking layer on the top cladding layer and patterning the third blocking layer to define vias;
   using the vias, etching ground openings through the top polymer cladding layer, the second blocking layer, the core layer, the first blocking layer, and the bottom cladding layer to the ground electrode;
   depositing an electrically conductive material in the ground openings, the electrically conductive material extending from electrical communication with the ground electrode to a surface of the top polymer cladding layer; and
   removing the third blocking layer and depositing electrical contacts on the top polymer cladding layer, at least some of the electrical contacts being in electrical communication with the electrically conductive material.

2. The method as claimed in claim 1 wherein the step of providing the platform includes providing a wafer of Si, SiGe, InP, GaAs, GaN, or GaSb.

3. The method as claimed in claim 2 wherein the step of providing the platform includes providing a silicon wafer and the step of forming the layer of dielectric or insulating material includes oxidizing the silicon wafer to produce a layer of silicon oxide.

4. The method as claimed in claim 1 wherein the step of depositing and patterning the ground electrode includes depositing multiple layers of metallization.

5. The method as claimed in claim 4 wherein the step of depositing and patterning the ground electrode includes depositing multiple layers of titanium and gold.

6. The method as claimed in claim 1 wherein the steps of depositing the bottom cladding layer of polymer material, depositing the core layer of polymer material, and depositing the top cladding layer of polymer material, each include spin coating a layer of formulated solution containing a selected polymer and baking the layer.

7. The method as claimed in claim 6 wherein the step of depositing the core layer of polymer material includes depositing a layer of polymer 1.6 μm (micrometers)+/−0.2 μm thick.

8. The method as claimed in claim 6 wherein the step of depositing the bottom cladding layer of polymer material includes depositing a layer of polymer material 3.5 μm (micrometers)+/−0.5 μm thick.

9. The method as claimed in claim 6 wherein the step of depositing the top cladding layer of polymer material includes depositing a layer of polymer material 3.5 μm (micrometers)+/−0.5 μm thick.

10. The method as claimed in claim 1 wherein the steps of depositing the first blocking layer and depositing the second blocking layer each include depositing a layer including aluminum oxide.

11. The method as claimed in claim 10 wherein the steps of depositing the first and second blocking layers of aluminum oxide includes depositing the aluminum oxide by sputtering.

12. The method as claimed in claim 10 wherein the steps of depositing the first and second blocking layers each include depositing a layer of aluminum oxide approximately 50 nm thick+/−10 nm.

13. The method as claimed in claim 1 wherein the step of depositing and patterning the ground electrode includes patterning the ground electrode to produce multiple spaced apart ground electrode contacts.

14. The method as claimed in claim 1 further including a step of patterning and etching the core layer to form ridges defining multiple waveguide ridges, each ridge of the multiple ridges overlying a ground electrode contact of the multiple ground electrode contacts.

15. The method as claimed in claim 4 wherein the step of patterning and etching the core layer to form ridges includes forming the ridges 0.8 μm+/−0.1 μm high.

16. The method as claimed in claim 1 wherein the step of depositing electrical contacts on the top polymer cladding layer includes depositing a gold seed layer on the top polymer cladding layer, forming a photoresist pattern on the gold seed layer defining openings overlying the electrically conductive material in the ground openings and each ridge of the multiple ridges, electroplating gold contacts in the openings, removing the photoresist pattern and removing the gold seed layer between the gold contacts.

17. A method of fabricating polymer based photonic apparatus comprising the steps of:

providing a semiconductor wafer;
forming a layer of dielectric or insulating material on the semiconductor wafer;
depositing and patterning a ground electrode on the layer of dielectric or insulating material;
depositing a bottom cladding layer of polymer material on the ground electrode and on exposed portions of the layer of dielectric or insulating material including spin coating a layer of formulated solution containing a selected polymer and baking the layer;
depositing a first blocking layer on the bottom cladding layer;
depositing a core layer of polymer material on the first blocking layer including spin coating a layer of formulated solution containing a selected polymer and baking the layer;
depositing a second blocking layer on the core layer;
depositing a top cladding layer of polymer material on the second blocking layer including spin coating a layer of formulated solution containing a selected polymer and baking the layer;
depositing a third blocking layer on the top cladding layer and patterning the third blocking layer to define vias;
using the vias, etching ground openings through the top polymer cladding layer, the second blocking layer, the core layer, the first blocking layer, and the bottom cladding layer to the ground electrode;
depositing an electrically conductive material in the ground openings, the electrically conductive material extending from electrical communication with the ground electrode to a surface of the top polymer cladding layer; and
removing the third blocking layer and depositing electrical contacts on the top polymer cladding layer, at least some of the electrical contacts being in electrical communication with the electrically conductive material.

18. The method as claimed in claim 17 wherein the steps of depositing the first blocking layer and depositing the second blocking layer each include depositing a layer including aluminum oxide.

19. The method as claimed in claim 17 wherein the step of depositing and patterning the ground electrode includes patterning the ground electrode to produce multiple spaced apart ground electrode contacts.

20. The method as claimed in claim 17 further including a step of patterning and etching the core layer to form ridges defining multiple waveguide ridges, each ridge of the multiple ridges overlying a ground electrode contact of the multiple ground electrode contacts.

21. The method as claimed in claim 17 wherein the step of depositing electrical contacts on the top polymer cladding layer includes depositing a gold seed layer on the top polymer cladding layer, forming a photoresist pattern on the gold seed layer defining openings overlying the electrically conductive material in the ground openings and each ridge of the multiple ridges, electroplating gold contacts in the openings, removing the photoresist pattern and removing the gold seed between the gold contacts.

22. Polymer based photonic apparatus comprising:
a semiconductor wafer;
a layer of dielectric or insulating material on the semiconductor wafer;
a ground electrode on the layer of dielectric or insulating material;
a bottom cladding layer of polymer material on the ground electrode and on exposed portions of the layer of dielectric or insulating material;
a first blocking layer on the bottom cladding layer;
a core layer of polymer material on the first blocking layer;
a second blocking layer on the core layer;
a top cladding layer of polymer material on the second blocking layer;
ground openings extending through the top cladding layer, the second blocking layer, the core layer, the first blocking layer, and the bottom cladding layer to the ground electrode;
electrically conductive material in the ground openings, the electrically conductive material extending from electrical communication with the ground electrode to a surface of the top polymer cladding layer; and
electrical contacts on the top polymer cladding layer, at least some of the electrical contacts being in electrical communication with the electrically conductive material.

23. The polymer based photonic apparatus as claimed in claim 22 wherein the ground electrode includes multiple layers, each of the multiple layers including one of gold and titanium.

24. The polymer based photonic apparatus as claimed in claim 22 wherein the ground electrode includes multiple spaced apart ground electrode contacts.

25. The polymer based photonic apparatus as claimed in claim 22 wherein the core layer of polymer material includes a layer of polymer 1.6 µm (micrometers)+/−0.2 µm thick.

26. The polymer based photonic apparatus as claimed in claim 22 wherein the bottom cladding layer of polymer material includes a layer of polymer material 3.5 µm (micrometers)+/−0.5 µm thick.

27. The polymer based photonic apparatus as claimed in claim 22 wherein the top cladding layer of polymer material includes a layer of polymer material 3.5 µm (micrometers)+/−0.5 µm thick.

28. The photonic apparatus polymer based as claimed in claim 22 wherein the core layer defines multiple waveguide ridges, each ridge of the multiple ridges overlying a ground electrode contact of the multiple ground electrode contacts.

29. The photonic apparatus polymer based as claimed in claim 28 wherein the core layer multiple waveguide ridges includes ridges 0.8 µm+/−0.1 µm high.

30. The polymer based photonic apparatus as claimed in claim 22 wherein the first blocking layer and the second blocking layer each include a layer including aluminum oxide.

31. The polymer based photonic apparatus as claimed in claim 30 wherein the first and second blocking layers each include a layer of aluminum oxide approximately 50 nm+/−10 nm thick.

32. The polymer based photonic apparatus as claimed in claim 22 wherein the semiconductor wafer includes one of silicon, SiGe, InP, GaAs, GaN, or GaSb.

33. The polymer based photonic apparatus as claimed in claim 22 wherein the apparatus includes one of a modulator, waveguide, mux, demux, detector, or spot size converter.

* * * * *